US009186979B2

(12) United States Patent
Martin

(10) Patent No.: US 9,186,979 B2
(45) Date of Patent: Nov. 17, 2015

(54) RESERVOIR FOR REDUCING AERATION OF A FLUID

(71) Applicant: MANN+HUMMEL GMBH, Ludwigsburg (DE)

(72) Inventor: Michael Martin, Portage, MI (US)

(73) Assignee: MANN + HUMMEL GMBH, Ludwigsburg (DE)

( * ) Notice: Subject to any disclaimer, the term of this patent is extended or adjusted under 35 U.S.C. 154(b) by 0 days.

(21) Appl. No.: 13/726,173

(22) Filed: Dec. 23, 2012

(65) Prior Publication Data

US 2014/0103047 A1  Apr. 17, 2014

Related U.S. Application Data

(60) Provisional application No. 61/714,050, filed on Oct. 15, 2012.

(51) Int. Cl.
| | |
|---|---|
| *B65D 6/00* | (2006.01) |
| *B65D 8/00* | (2006.01) |
| *B60K 11/02* | (2006.01) |
| *B65D 25/22* | (2006.01) |
| *B65D 8/02* | (2006.01) |
| *B67C 3/30* | (2006.01) |

(52) U.S. Cl.
CPC .............. *B60K 11/02* (2013.01); *B65D 11/08* (2013.01); *B65D 25/22* (2013.01); *B67C 3/30* (2013.01); *Y10T 29/49826* (2015.01); *Y10T 29/53* (2015.01)

(58) Field of Classification Search
CPC ......... G01F 23/30; B29C 49/20; B29C 41/04; B01D 35/027; B65D 25/22; B65D 51/16
USPC ........ 220/4.12, 628; 29/428, 700; 210/167.32
See application file for complete search history.

(56) References Cited

U.S. PATENT DOCUMENTS

| | | | | |
|---|---|---|---|---|
| 4,343,353 | A * | 8/1982 | Tsopelas ...................... 165/119 |
| 4,739,730 | A * | 4/1988 | Jenz et al. ................. 123/41.54 |
| 5,088,453 | A * | 2/1992 | Kleineberg et al. ........ 123/41.54 |
| 5,104,294 | A * | 4/1992 | Banba ............................. 417/36 |
| 5,356,535 | A * | 10/1994 | Ueno et al. ................. 210/416.5 |
| 5,456,218 | A * | 10/1995 | Theorell .................... 123/41.54 |
| 6,035,930 | A * | 3/2000 | Schwartz ...................... 165/169 |
| 6,193,924 | B1 * | 2/2001 | Huse ............................. 264/503 |
| 6,286,545 | B1 * | 9/2001 | Moy et al. ..................... 137/574 |
| 6,792,906 | B2 * | 9/2004 | Grant ....................... 123/184.21 |
| 7,059,187 | B2 * | 6/2006 | Clarke et al. .................... 73/305 |
| 7,117,896 | B2 * | 10/2006 | Eberling et al. .............. 137/899 |
| 7,261,123 | B2 * | 8/2007 | Kim ............................... 137/550 |
| 7,618,533 | B2 * | 11/2009 | Anderson et al. ........ 210/167.01 |
| 8,038,878 | B2 * | 10/2011 | Hewkin ................... 210/167.32 |
| 2005/0115884 | A1 * | 6/2005 | Suzuki et al. ................. 210/282 |
| 2006/0000757 | A1 * | 1/2006 | Becker .......................... 210/171 |
| 2006/0102626 | A1 * | 5/2006 | Mitsch et al. ................ 220/4.12 |
| 2007/0119770 | A1 * | 5/2007 | Suzuki et al. ................. 210/282 |
| 2007/0221554 | A1 * | 9/2007 | Wright ......................... 210/120 |
| 2009/0233134 | A1 * | 9/2009 | Hobmeyr et al. ............... 429/26 |
| 2010/0089913 | A1 * | 4/2010 | Dexter et al. ................ 220/4.12 |
| 2014/0103052 | A1 * | 4/2014 | Hill .............................. 220/628 |

* cited by examiner

*Primary Examiner* — Anthony Stashick
*Assistant Examiner* — Jennifer N Zettl
(74) *Attorney, Agent, or Firm* — James Hasselbeck

(57) ABSTRACT

A fluid reservoir includes a housing, a nozzle and a cup. The housing defines a chamber for retaining a fluid. The nozzle receives the fluid and directs the fluid toward the chamber. The cup is disposed in the chamber and defines an interior volume in fluid communication with the nozzle for directly receiving the fluid from the nozzle. A portion of the cup may be captured between the housing and the nozzle. The cup defines at least one fluid path between the interior volume and the chamber.

16 Claims, 5 Drawing Sheets

RESERVOIR FOR REDUCING AERATION OF A FLUID

CROSS REFERENCE TO RELATED APPLICATIONS

This application claims the benefit of U.S. Provisional Patent Application No. 61/714,050, filed Oct. 15, 2012 entitled "FLUID RESERVOIR AND METHOD OF MANUFACTURING A FLUID RESERVOIR" and which is hereby incorporated by reference in its entirety.

FIELD

The present disclosure generally relates to fluid reservoirs. More particularly, the present disclosure relates to a reservoir for reducing aeration of a fluid. The present disclosure also more particularly relates to a method of manufacturing a fluid reservoir for reducing aeration of a fluid.

BACKGROUND

This section provides background information related to the present disclosure which is not necessarily prior art.

Operation of a motor vehicle requires the circulation of various fluids. For example, in a conventional motor vehicle coolant is used to both extract heat from the engine and direct heat to a heater core disposed in the passenger compartment. A pump circulates coolant heated by the engine from the engine to both the heater core and a radiator. Heat is extracted from the coolant by both the radiator and the heater core. The pump further circulates the cooled fluid from both the radiator and the heater core back to the engine for further cooling of the engine.

When the temperature of coolant increases, the volume correspondingly expands. A radiator cap maintains the pressure in the radiator to a predetermined maximum amount. A coolant reservoir is conventionally provided to accommodate expansion of the coolant and to also store a reserve of the coolant.

Fluid (e.g., coolant) entering a conventional reservoir may become aerated. For example, the fluid may enter the reservoir at a relatively high speed and become aerated in response to turbulence. Air bubbles may be introduced into the flowing fluid in the coolant fluid circuit within the engine and radiator components. It can occur that air is trapped in the engine cooling system and that portions of the trapped air may become entrained into the coolant fluid flow as air bubbles. The air captured in the fluid is preferably released from the fluid before the fluid exits the fluid reservoir (e.g., for heat transfer within the vehicle). Also it is advantageous to prevent foaming within the reservoir, such as due to the presence of entrained air.

While known fluid reservoirs such as coolant reservoirs have proven to be generally successful for their intended purposes, a continuous need for improvement remains in the pertinent art.

SUMMARY

This section provides a general summary of the disclosure, and is not a comprehensive disclosure of its full scope or all of its features.

In accordance with one particular aspect, the present teachings provide a fluid reservoir including a housing, a nozzle and a cup. The housing defines a chamber for retaining a fluid. The nozzle receives the fluid and directs the fluid into the chamber. The cup is at least partially disposed in the chamber and defines an interior volume in fluid communication with the nozzle for directly receiving the fluid from the nozzle. The cup defines at least one fluid path between the interior volume thereof and the chamber.

In accordance with another particular aspect, the present teachings similarly provide a fluid reservoir including a housing, a nozzle and a cup. The housing defines a chamber for retaining a fluid. The housing has an opening. The nozzle includes a mounting portion and an extending portion. The mounting portion is secured to the housing. The extending portion extends from the mounting portion. The cup is at least substantially disposed in the chamber such that the extending portion of the nozzle extends into an interior volume of the cup. The cup defines at least one fluid path between the interior volume and the chamber.

In accordance with yet another particular aspect, the present teachings provide a method of manufacturing a fluid reservoir for reducing aeration of a fluid. The method includes providing a housing having an opening and defining a chamber for retaining a fluid. The method additionally includes inserting at least a portion of a cup through the opening and into the chamber. The cup defines at least one fluid path between an interior volume of the cup and the chamber. The method further includes securing a nozzle to the housing such that the cup is captured between the housing and the nozzle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings. The elements of the drawings are drawn to scale in the various views.

DETAILED DESCRIPTION

Figure 1:
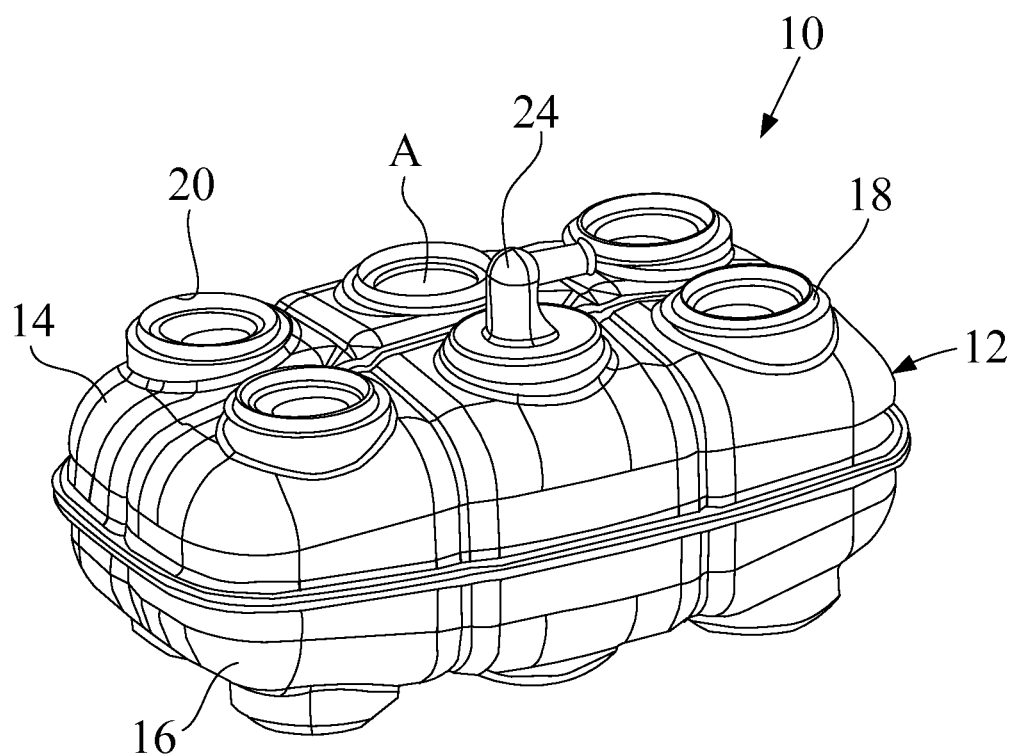
FIG. 1 is a perspective view of a fluid reservoir constructed in accordance with the present teachings.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
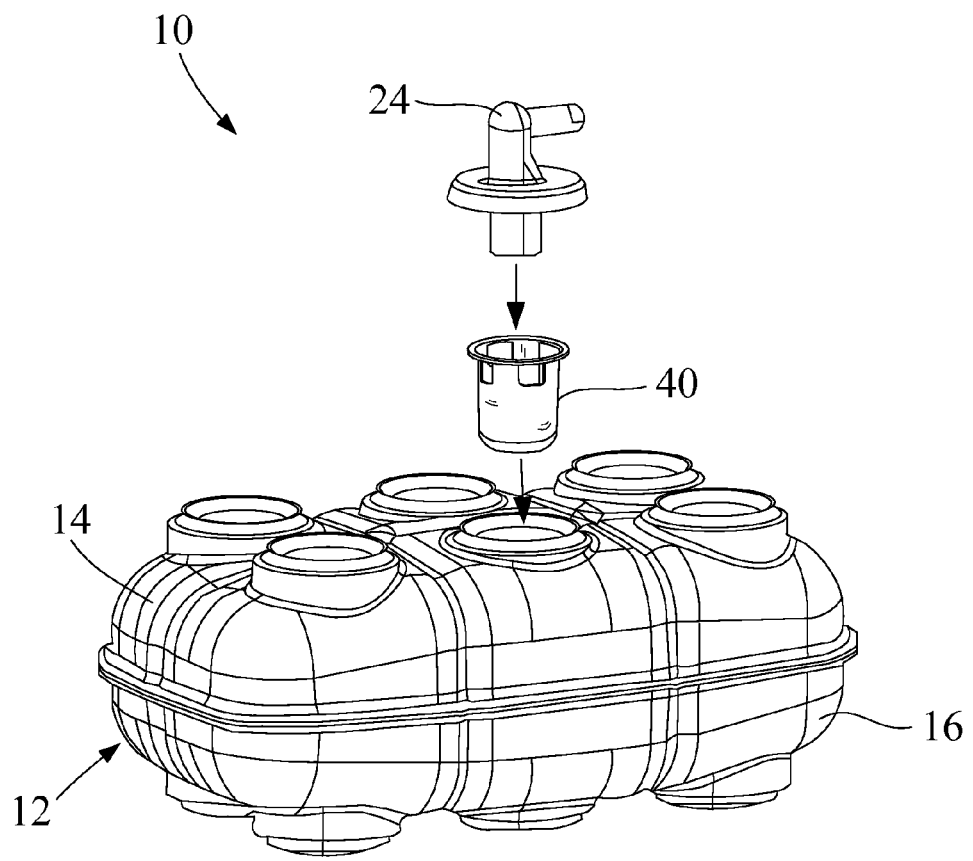
FIG. 2 is an exploded, perspective view of the fluid reservoir of FIG. 1.
Figure 3:
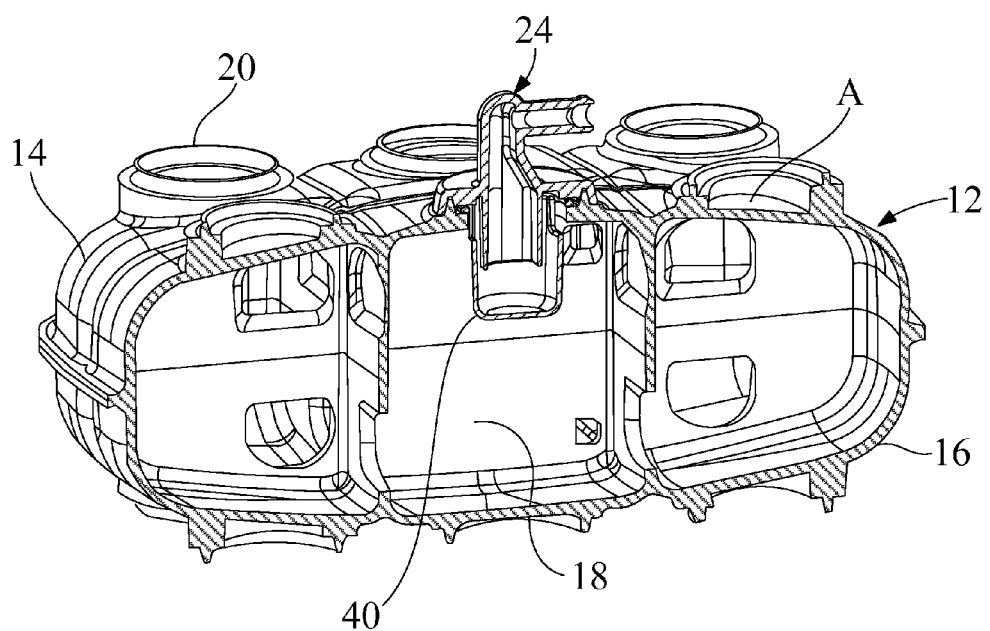
FIG. 3 is a cross-sectional view taken along the line 3-3 of FIG. 1.
Figure 4:
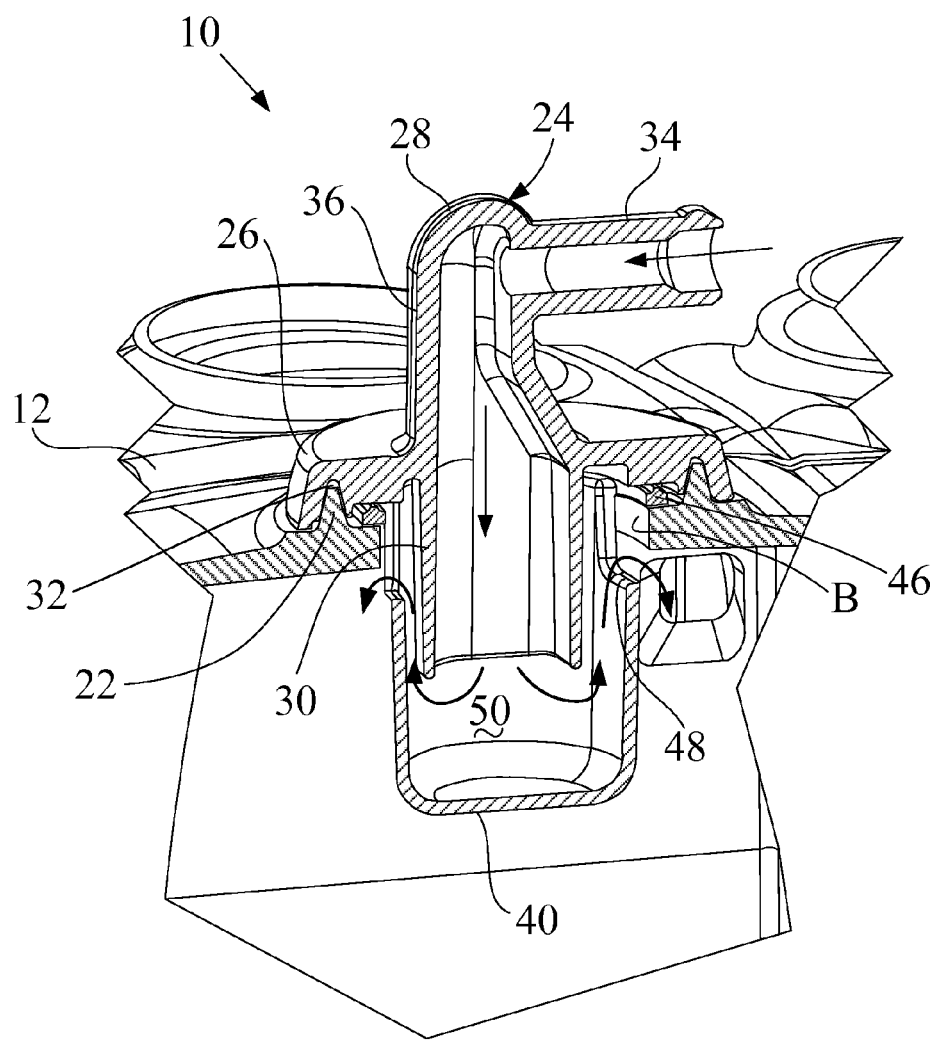
FIG. 4 is an enlarged view of a portion of the cross section of FIG. 3.
Figure 5:
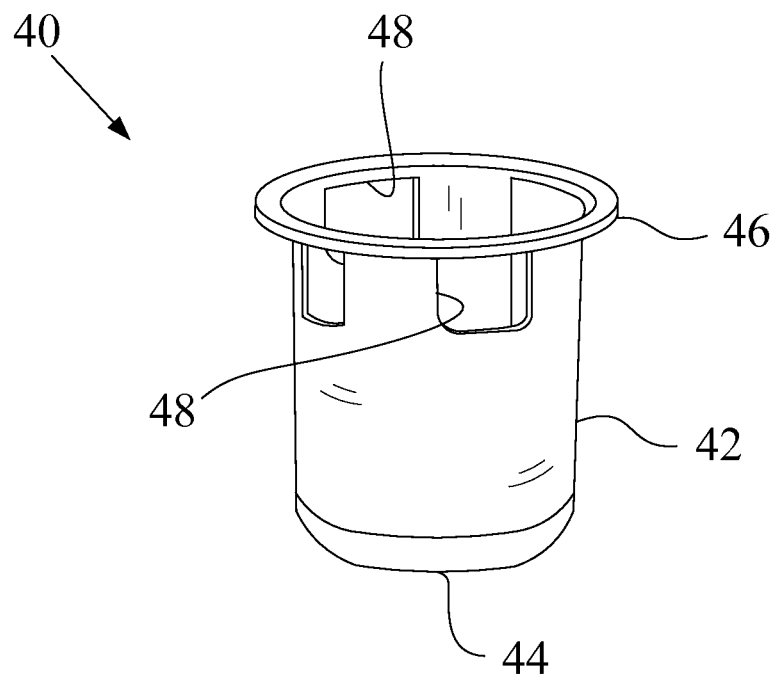
FIG. 5 is an enlarged view of a cup of the fluid reservoir of the present teachings.

With general reference to FIGS. 1 through 5 of the drawings, a fluid reservoir constructed in accordance with the present teachings is generally shown and identified at reference character 10. The reservoir 10 is particularly intended to reduce aeration of a fluid. In the embodiment illustrated, the fluid reservoir is a coolant reservoir 10 for coolant. It will be understood, however, that the present teachings may be adapted for other uses in which a reduction of fluid aeration is desired.

While not illustrated, it will be understood that the fluid reservoir 10 may be in fluid communication with an engine and a radiator of a motor vehicle. The fluid reservoir 10 may also be in fluid communication with a heater core disposed in a passenger compartment of the motor vehicle for heating the passenger compartment. A pump may circulate fluid (e.g., coolant) heated by the engine from the engine to the radiator and the heater core. Heat may be extracted from the fluid by both the radiator and the heater core. The cooled fluid may be returned to the engine for further cooling of the engine.

The coolant reservoir 10 is illustrated to generally include a housing 12. As shown throughout the drawings, the housing 10 may be generally rectangular in shape. Explaining further, the housing 10 may include six generally orthogonally oriented sides. With the scope of the present teachings, however, the housing 10 any suitable shape for a particular application.

The housing 10 may include one or more housing elements 14 and 16 that cooperate to define a cavity 18 within the housing 10. In the embodiment illustrated, the housing 10 includes first and second housing elements 14 and 16. As illustrated, the first and second housing elements 14 and 16 may be upper and lower housing elements, respectively. The housing elements 14 and 16 may be constructed of polypropylene or any other suitable material. The housing elements 14 and 16 may be thermal welded, friction welded, laser welded, ultrasonic welded, adhesively secured or otherwise securely fastened to closely mate to each other to form the unitary housing 10.

As shown throughout the drawings, the housing elements 14 and 16 may be identical to one another. As such, it may be possible to reduce associated tooling costs, design costs and inventories. Given the similarities between the housing elements 14 and 16, the housing element 14 may be described herein in more detail as compared to the housing element 16 but a complete understanding of the present teachings will be apparent therefrom.

The housing 12 may, in some aspects, carry one or more mounting or attachments portions 20 formed into or secured onto the housing. As illustrated, the housing includes a plurality of mounting portions 20. While six (6) mounting portions 20 are illustrated, a greater or lesser number may be incorporated within the scope of the present teachings.

The mounting portions 20 may be integrally formed with the housing elements 14 and 16. For example, the housing 12 may be injection molded to integrally include the mounting portions. Alternatively, the mounting portions 20 may be separately formed of similar or distinct material and secured to the housing elements 14 and 16 in any manner well known in the art.

The housing 12 is illustrated throughout the drawings to include a plurality of substantially identical mounting portions 20, although it is to be understood that the mounting portions 20 may have differing configurations and do not need to be substantially identical. Each mounting portion 20 may include an upwardly extending flange 22. The upwardly extending flange 22 may be cylindrical in shape and may be integral with the mounting portion. An area A circumscribed by each upwardly extending flange 22 may be closed until such time that it is desired to selectively attach a fitting thereto. The area A may be a generally circular and planar portion of the housing. In this regard, an opening B may be punched or otherwise suitably formed in the housing 12 at one of the areas A.

One or more fittings may be selectively attached to the housing 12. The fittings may include a neck member for a cap, inlet ports, outlet ports and nozzles. The various mounting portions 20 provide flexibility for attachment of the various fittings. This particular aspect of the present teachings and another exemplary fitting is described in further detail in commonly assigned U.S. Ser. No. 13/726,174 filed concurrently which is incorporated by reference as if fully set forth herein.

The coolant reservoir 10 is further illustrated to generally include a fitting in the form of a nozzle or hose fitting 24. In a conventional manner, a hose may be attached to the nozzle 24 for the delivery of fluid (e.g., coolant) to the reservoir 10. The nozzle 24 may generally including a base or mounting portion 26, a first end 28 and a second end 30. The nozzle 24 may be unitarily formed from polypropylene or other suitable material.

The mounting portion 26 of the nozzle 24 may be generally circular or disk-shaped. As illustrated in the cross-sectional view of FIG. 4, an underside of the mounting portion 26 may be formed to include a generally circular recess 32. The generally circular recess 32 is sized to cooperatively receive the upwardly extending flange 22 upon attachment of the nozzle 24 to the housing 12. Alternatively, the housing 12 may include the recess 32 and the mounting portion 26 may include the flange 22. The nozzle 24 may be spin welded or otherwise suitable attached to the housing 12. Upon attachment, the interface between the recess 32 and the flange 22 establishes a fluid-tight seal between the housing 12 and the nozzle 24.

The first end 28 of the nozzle 24 is illustrated in the drawings as an upper end and may be generally L-shaped. A first leg 34 of the first end 28 may be engaged with the hose (not particularly shown) for receiving fluid. The second leg 36 may extend downward from the first leg 34 to the base 26. The second leg 36 may widen as it approaches the base 26.

The second end 30 of the nozzle 24 may define a downwardly extending portion 30 and may extend downward from the base 26. As illustrated, the second end 30 may generally be an extension of the second leg 36. The base 26 may circumferentially surround the first and second ends 28 and 30 at an intersection of the first and second ends 28 and 30.

The coolant reservoir 10 is further illustrated to generally include a cup 40. As will become more apparent below, the cup 40 may generally function to receive fluid from the nozzle 24 and transfer the fluid to the chamber 18 without aeration of the fluid that may otherwise occur. The cup 40 may generally include a sidewall 42 that extends between a bottom 44 and an upper end 46. In the embodiment illustrated, the sidewall is a circular sidewall 42. The upper end may comprise a mounting portion in the form of a radially extending flange 46. In the embodiment illustrated, the flange 46 completely circumscribes the sidewall 42. In other embodiments, the flange 46 may be segmented or otherwise extend only partially around the sidewall 42.

Proximate the flange 46, the circular sidewall 42 may be formed to include one or more windows or openings 48. As illustrated, the sidewall 42 may be formed to include a plurality of windows 48 having four windows. In other applications, a greater or lesser number of windows 48 may be included in the sidewall 42.

The cup 40 may extend at least partially through a hole B in the housing 12 and into the chamber 18. As perhaps most clearly shown in the enlarged cross section of FIG. 4, the sidewall 42 of the cup 40 may have a diameter less than a diameter of the hole B to facilitate passage of the sidewall 42 through the hole B. The flange 46 may have a diameter greater than the diameter of the hole B such that the flange 46 is prevented from passing through the hole B. The at least one window 48 in the sidewall 42 defines at least one fluid path between an interior volume 50 of the cup 40 and the chamber 18.

The nozzle 24 may be mounted to the housing 12 such that the flange 46 is axially captured between the nozzle 24 and the housing 12. The second portion 30 of the nozzle 24 may extend downward into the interior volume 50 of the cup. As illustrated, the second portion 30 may extend down below the one or more windows 48 of the sidewall 42.

In use, coolant enters the first leg 34 of the nozzle 24 and then passes through the second leg 36. The velocity of the fluid may be reduced as a result of the increasing cross-section area of the widened lower portion of the second leg 36. The coolant continues through the downwardly extending or second portion 38 of the nozzle 24. The coolant exits the nozzle 24 at a bottom end of the second leg 36 and is directly received by the cup 40. The coolant mixes with a pool of coolant at the bottom of the cup 40. Coolant flows up and out of the cup 40 through the one or more windows 48 and into the chamber 18 of the housing 12.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A fluid reservoir comprising:
a housing defining a chamber for retaining a fluid;
a nozzle for receiving the fluid and directing the fluid toward the chamber, the nozzle having:
a disk-shaped mounting portion securing the nozzle onto the housing;
a downwardly extending portion having a fluid passage therein, the downwardly extending portion extending through the mounting portion, the downwardly extending portion having a first end positioned external to the housing and an opposing second end at an interior of the housing; and
a cup at least partially disposed in the chamber, the cup defining an interior volume in fluid communication with the nozzle for directly receiving the fluid from the nozzle, the cup defines at least one fluid path between the interior volume and the chamber;
wherein the cup includes a closed bottom and the at least one fluid path is above the bottom;
wherein the housing has an opening and the cup has a generally cylindrical sidewall sized to pass through the opening, the cup further including a retaining portion proximate an upper end thereof sized to prevent passage of the upper end through the opening;
wherein the generally cylindrical sidewall closes against the closed bottom and extends between the closed bottom and the retaining portion of the cup;
wherein the interior volume of the cup receives the fluid from the nozzle, the closed bottom and sidewall holding a pool of fluid in the cup;
wherein the at least one fluid path is at least one window arranged in the generally cylindrical sidewall of the cup through which the fluid exits the cup;

wherein the second end of the downwardly extending portion of the nozzle is positioned into the pool of fluid below the at least one window of the cup.

2. The fluid reservoir of claim 1, wherein the at least one window is arranged proximate an upper end of the cup.

3. The fluid reservoir of claim 1, wherein the nozzle and the fluid cup cooperate to route fluid from the nozzle, down into the cup, up from a lowermost portion of the nozzle and through the at least one fluid path to the chamber.

4. The fluid reservoir of claim 1, wherein the nozzle and the fluid cup cooperate to reduce aeration of the fluid entering the chamber.

5. The fluid reservoir of claim 1, wherein the housing includes one of a circumferential flange and a circumferential groove and the nozzle includes the other of the circumferential flange and circumferential groove, the circumferential flange receiving the circumferential groove.

6. The fluid reservoir of claim 1, wherein the nozzle is spin welded to the housing.

7. A fluid reservoir comprising:
a housing defining a chamber for retaining a fluid, the housing having an opening;
a nozzle including a mounting portion secured to the housing and an extending portion extending from the mounting portion, the nozzle having:
a disk-shaped mounting portion securing the nozzle onto the housing;
an downwardly extending portion having a fluid passage therein, the downwardly extending portion extending through the mounting portion, the downwardly extending portion having a first end positioned external to the housing and an opposing second end at an interior of the housing; and
a cup at least partially disposed in the chamber such that the extending portion of the nozzle extends into an interior volume of the cup, the cup defining at least one fluid path between the interior volume and the chamber;
wherein the cup includes a closed bottom and the at least one fluid path is above the bottom;
wherein the housing has an opening and the cup has a generally cylindrical sidewall sized to pass through the opening, the cup further including a circumferentially extending flange arranged at an upper end of the cup, the circumferentially extending flange having diameter greater than a diameter of the opening;
wherein the generally cylindrical sidewall closes against the closed bottom and extends between the closed bottom and the circumferentially extending flange;
wherein the interior volume of the cup receives the fluid from the nozzle, the closed bottom and sidewall holding a pool of fluid in the cup;
wherein the at least one fluid path is at least one window arranged in the generally cylindrical sidewall of the cup proximate an upper end of the cup;
wherein the second end of the downwardly extending portion of the nozzle is positioned into the pool of fluid and arranged below the at least one window.

8. The fluid reservoir of claim 7, wherein the at least one window is arranged proximate an upper end of the cup.

9. The fluid reservoir of claim 7, wherein the nozzle and the fluid cup cooperate to route fluid from the nozzle, down into the cup, up from a lowermost portion of the nozzle and through the at least one fluid path to the chamber.

10. The fluid reservoir of claim 7, wherein the nozzle and the fluid cup cooperate to reduce aeration of the fluid entering the chamber.

11. The fluid reservoir of claim 7, wherein the housing includes one of a circumferential flange and a circumferential groove and the nozzle includes the other of the circumferential flange and circumferential groove, the circumferential flange receiving the circumferential groove.

12. A method of manufacturing a fluid reservoir for reducing aeration of a fluid, the method comprising:
providing a housing having an opening and defining a chamber for retaining a fluid;
providing a cup having a closed bottom and a lower end of a generally cylindrical sidewall closing against the closed bottom, the cup including a retaining portion arranged at an upper end of the cup and a window and a path for fluid exiting the cup, the window arranged proximate to the upper end of the cup;
inserting at least a portion of the cup through the opening and into the chamber, the cup defining at least one fluid path between an interior volume of the cup and the chamber; and
securing a nozzle to the housing such that the cup is captured between the housing and the nozzle and such that the nozzle extends into the cup to a position below the window and above the closed bottom of the cup,
wherein a fluid passage of the nozzle is increases in cross-section towards the closed bottom of the cup, the increasing cross-section reducing velocity of fluid entering the pool of fluid in the cup.

13. The method of claim 12, wherein securing the nozzle to the housing includes spin welding the nozzle to the housing.

14. The method of claim 12, wherein the housing includes one of a circumferential flange and a circumferential groove and the mounting portion of the nozzle includes the other of the circumferential flange and circumferential groove, the circumferential flange receiving the circumferential groove.

15. The method of claim 12, wherein a fluid path is established that routes fluid from the nozzle, down into the cup, up from a lowermost portion of the nozzle and through the at least one fluid path to the chamber.

16. The method of claim 12, wherein the housing has an opening and the generally cylindrical sidewall is sized to pass through the opening, the retaining portion sized to prevent passage of the upper end through the opening.

* * * * *